US012656185B2

(12) United States Patent
Strache et al.

(10) Patent No.: US 12,656,185 B2
(45) Date of Patent: Jun. 16, 2026

(54) POWER MODULE WITH INTEGRATED TEMPERATURE SENSING CONDUCTOR LOOP

(71) Applicant: Robert Bosch GmbH, Stuttgart (DE)

(72) Inventors: Sebastian Strache, Wannweil (DE); Jan Homoth, Reutlingen (DE); Thoralf Rosahl, Eningen (DE); Alexander Barner, Reutlingen (DE); Oliver Grossmann, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 550 days.

(21) Appl. No.: 17/793,012

(22) PCT Filed: Mar. 23, 2021

(86) PCT No.: PCT/EP2021/057382
§ 371 (c)(1),
(2) Date: Jul. 14, 2022

(87) PCT Pub. No.: WO2021/191187
PCT Pub. Date: Sep. 30, 2021

(65) Prior Publication Data
US 2023/0082076 A1 Mar. 16, 2023

(30) Foreign Application Priority Data

Mar. 26, 2020 (DE) ..................... 10 2020 203 918.6

(51) Int. Cl.
*G01K 7/16* (2006.01)

(52) U.S. Cl.
CPC .......... *G01K 7/16* (2013.01); *G01K 2215/00* (2013.01)

(58) Field of Classification Search
CPC ......... G01K 7/16; G01K 2215/00; G01K 7/18
See application file for complete search history.

(56) References Cited

U.S. PATENT DOCUMENTS

| | | | |
|---|---|---|---|
| 10,260,961 | B2 | 4/2019 | Ferguson et al. |
| 2017/0125998 | A1 | 5/2017 | Tiziani et al. |

(Continued)

FOREIGN PATENT DOCUMENTS

| | | |
|---|---|---|
| CN | 104157644 A | 11/2014 |
| DE | 19522126 A1 | 1/1997 |

(Continued)

OTHER PUBLICATIONS

"Co-fired Ceramic", Wikipedia, Dec. 18, 2019, https://en.wikipedia. org/w/index.php?title=Co-fired_ceramic&oldid=931277160 (Year: 2019).*

(Continued)

*Primary Examiner* — Laura Martin
*Assistant Examiner* — Julia Fitzpatrick
(74) *Attorney, Agent, or Firm* — NORTON ROSE FULBRIGHT US LLP

(57) ABSTRACT

A power module. The power module includes a substrate and at least one power transistor arranged on a bottom side of the substrate. The power module includes at least one power connection connected to the substrate. A conductor loop for measuring temperature is arranged on an inner or outer substrate layer or a top side opposite the power transistor.

15 Claims, 4 Drawing Sheets

(56) References Cited

U.S. PATENT DOCUMENTS

| | | | |
|---|---|---|---|
| 2017/0176260 A1 | 6/2017 | Ferguson et al. | |
| 2019/0259837 A1* | 8/2019 | Masuda | H01L 23/04 |

FOREIGN PATENT DOCUMENTS

| | | | | |
|---|---|---|---|---|
| DE | 102010050315 A1 * | 5/2012 | ............... | G01K 7/16 |
| DE | 102014208526 A1 | 12/2015 | | |
| FR | 2759456 A1 * | 8/1998 | ............... | G01K 7/16 |
| KR | 20170137506 A * | 12/2017 | | |

OTHER PUBLICATIONS

Honsberg, Christiana and Bowden, Stuart, PV Education, Apr. 22, 2018, https://www.pveducation.org/pvcdrom/characterisation/four-point-probe-resistivity-measurements (Year: 2018).*
"IC Package Types and How to Choose One", AnySilicon, May 29, 2019, https://anysilicon.com/ic-package-types-and-how-to-choose-one/ (Year: 2019).*
International Search Report for PCT/EP2021/057382, Issued Jul. 6, 2021.

* cited by examiner

POWER MODULE WITH INTEGRATED TEMPERATURE SENSING CONDUCTOR LOOP

FIELD

The present invention relates to a power module including a substrate, and at least one power transistor arranged on a bottom side of the substrate, and at least one power connection connected to the substrate.

BACKGROUND INFORMATION

Power modules generate large quantities of highly localized heat, which may markedly reduce the life of the power module if not adequately cooled/turned down. At the same time, in larger arrangements of power modules, it is difficult to provide targeted cooling where required and/or to measure the temperature of the individual power transistors without a significant delay, and to maintain an overview of the extent to which the individual power modules and/or power semiconductor devices/power transistors are loaded.

Temperature is detected in power modules in different ways:

NTC (negative temperature coefficient)—or PTC (positive temperature coefficient)—resistors are arranged close to the power transistors in the power module, and the temperature is determined by way of the temperature-dependent resistance thereof, temperature is detected by way of special arrangements of components (diodes/resistors) on the substrate, temperature-sensitive, electrically measurable properties of the power transistors are used to determine the temperature of each power transistor directly.

However, the aforementioned solutions are either imprecise and/or, because of their distance from the hottest point, exhibit a significant time delay in measuring a temperature peak, or require a distinctly complicated power transistor structure.

SUMMARY

According to an example embodiment of the present invention, a power module of the type mentioned in the introduction is provided, wherein a conductor loop for measuring temperature is arranged on an inner or outer substrate layer or a top side opposite the power transistor.

This has the advantage that the temperature is measured significantly closer to the at least one power transistor than was previously the case, and thus at the source of the heat loss. It is thus possible to avoid a situation in which a power transistor becomes too hot before the heat reaches the conductor loop by thermal conduction, as may be the case in the prior art because of the greater distance. Any significant exceedance of the operating temperature generally reduces the life of the individual power transistor.

In addition, in power modules having a plurality of power transistors, there is a certain probability of one power transistor heating up on average more often and to a greater extent than the other power transistors, and thus being the first to fail. Furthermore, manufacturing tolerances mean that, with the same load, one power transistor may heat up to a higher temperature than another power transistor of the same type. However, a failure of just one power transistor often leads to the whole power module having to be replaced.

The solution according to the present invention therefore makes it significantly easier to monitor the thermal load of the individual power transistors and, if necessary, to take counter-measures in order to increase the overall life of the power module.

In accordance with an example embodiment of the present invention, the substrate is preferably a multi-layer substrate, so that both the power and logic wiring (e.g. control lines for power transistors) and the conductor loop required for measuring temperature can be integrated. The bottom side of the substrate may be, for example, the lowest layer of the substrate, or at least the lowest layer having conducting elements. Correspondingly, the top side of the substrate may be, for example, the uppermost layer of the substrate on which conducting elements are arranged.

The conductor loop may be arranged opposite the whole of the power transistor or only a part of the power transistor. If a plurality of power transistors are connected to a substrate, each power transistor is preferably provided with its own conductor loop above the respective power transistor, e.g. in an inner layer or the top side of the substrate. In that case, however, the individual conductor loops may be connected to a common electronic evaluation system (e.g. an application-specific integrated circuit, ASIC, of the power module).

Advantageous developments of the present invention are disclosed herein.

The conductor loop preferably has a meandering shape. This allows the size of the conductor path to be increased under the influence of elevated temperature, thus, for example, allowing the greatest possible absolute effect on the resistance of the conductor loop to be achieved.

The conductor loop is preferably arranged opposite the source of the power transistor. In a field-effect transistor, the source is generally the strongest heat source because of its closeness to the active region of the transistor, and therefore, for optimum sensitivity, the conductor loop may be arranged only opposite the source. Since local temperature peaks may lead to areas of long-term damage, they are a significantly better indicator of problematic overheating than the average temperature of the power transistor. It is therefore advantageous for the temperature measurement to target the area of the power transistor that is generally hottest.

In one specific embodiment of the present invention, the conductor loop extends over a plurality of substrate layers. This allows the accuracy of the temperature measurement to be increased. The conductor loop may have a meandering shape in a plurality of substrate layers. The conductor loop may be connected to the various substrate layers by way of through-holes (vias).

It is preferred if at least two power transistors are arranged on the substrate, with a separate conductor loop for measuring temperature being arranged above each of the respective power transistors in an inner layer or the top side of the substrate. A separate conductor loop is preferably arranged for each power transistor, i.e., for example, three, four, five, six or more power transistors and conductor loops of the same power module.

In one specific embodiment of the present invention, at least one conductor loop includes a temperature-dependent resistor. In this case, it is possible to measure resistance, and thus temperature, by way of the temperature-dependent resistor, e.g. by way of a current measurement at constant voltage. The temperature-dependent resistor may be an NTC resistor or a PTC resistor.

In a preferred specific embodiment of the present invention, the power module includes at least one application-specific integrated circuit (ASIC), which is connected to at least two power transistors and to the at least two corresponding conductor loops. In this case, the ASIC can regulate the individual power transistors, e.g. by single-gate control, to adjust the thermal load of the power transistors (momentarily or over time) and thus to increase the overall life or performance of the power module. The ASIC may be arranged on the bottom side or the top side of the substrate. In the latter case, the conductor loops may be connected to the ASIC e.g. by way of through-holes (vias).

In one specific embodiment, the application-specific integrated circuit is configured so that it controls the loading of the at least two power transistors in such a way that the temperature measured by the conductor loops is, as far as possible, equal. This solution is as simple as possible, since it is not essential to store a "temperature history" for the individual power transistors in order to decide which power transistor can and should be loaded to a greater extent. It is then possible during operation simply to turn down the power transistor(s) with a temperature above an upper temperature threshold (a problematic temperature), and to turn up those power transistors with a temperature below a lower temperature threshold (a non-problematic temperature). The use of two different thresholds here can stabilize the regulation to avoid frequent upward and downward adjustments.

It is preferred if the substrate is or includes a multi-layer low-temperature co-fired ceramic (LTCC). With a substrate of this type, it is readily possible to provide additional conductor loops for measuring temperature on the top side opposite the bottom side which includes the power transistors, and/or in the inner layers, without significantly complicating the manufacturing processes.

In one specific embodiment of the present invention, the temperature measurement takes place in at least one conductor loop by way of a four-point measurement or an end-of-line calibration. These measuring methods increase the accuracy of the measurement without significantly complicating the structure. In this case, however, a different layout of the conductor loop and corresponding connections to the electronic evaluation system (e.g., local ASIC) are necessary.

In one specific embodiment of the present invention, a plurality of conductor loops are arranged in different substrate layers and connected in series. This allows the length of the conductor loop in the hot region to be maximized. As a result, there is a greater change in resistance in response to a change in temperature, and therefore greater sensitivity of the temperature measurement.

In one specific embodiment of the present invention, the power module includes at least two substrates. A power wiring and the conductor loops for measuring temperature may be arranged in one of the two substrates (e.g. in different substrate layers) in this case.

In one specific embodiment of the present invention, the power module includes a plurality of power semiconductor devices embedded between substrate layers. Here, the power module preferably includes only one substrate with a plurality of substrate layers. The power semiconductor devices may be arranged in an inner substrate layer and embedded or sandwiched between further substrate layers on both sides.

In one specific embodiment of the present invention, the power module includes a plurality of power semiconductor devices embedded between two substrates, with conductor loops for measuring temperature being arranged in at least one of the substrates. These power semiconductor devices are preferably embedded in the substrate "head first", so that the source surface is located on the bottom side. In this case, the meandering structure would be arranged "below" the power transistors (e.g. MOSFETs). In addition to the power transistor, therefore, the power module also includes a plurality of power semiconductor devices, the temperature of which can likewise be measured using one or more conductor loops. The power semiconductor devices may be, for example, power diodes, thyristors or triacs.

In one specific embodiment of the present invention, the power module includes at least one power semiconductor device, with a further conductor loop for measuring temperature being arranged on a top side of the substrate opposite the power semiconductor device. Here too, therefore, in addition to the power transistor, the power module also includes at least one power semiconductor device, the temperature of which can likewise be measured using a conductor loop. The power semiconductor device may be, for example, a power diode, a thyristor or a triac.

Compared to traditional arrangements (NTC) of the conductor loop next to a power semiconductor device on a lower substrate, the conductor loop according to the present invention is very close to the hotspot and is not arranged in the cooling path. This makes it possible to measure the maximum temperature of the power semiconductor device with high precision.

An outer layer of a substrate is preferably understood to be the top and bottom layers of a substrate. Outer layers therefore have no contact with further substrate layers on one side.

An inner substrate layer or inner layer is understood to be a substrate layer located between two layers of substrate. Accordingly, a substrate always has at least one outer layer but not necessarily an inner layer. For an inner layer, there must be at least three substrate layers, i.e. two outer layers (top, bottom) and an inner layer between these two outer layers.

BRIEF DESCRIPTION OF THE DRAWINGS

Exemplary embodiments of the present invention will be explained in more detail with reference to the figures and the following description.

DETAILED DESCRIPTION OF EXAMPLE EMBODIMENTS

Figure 1:
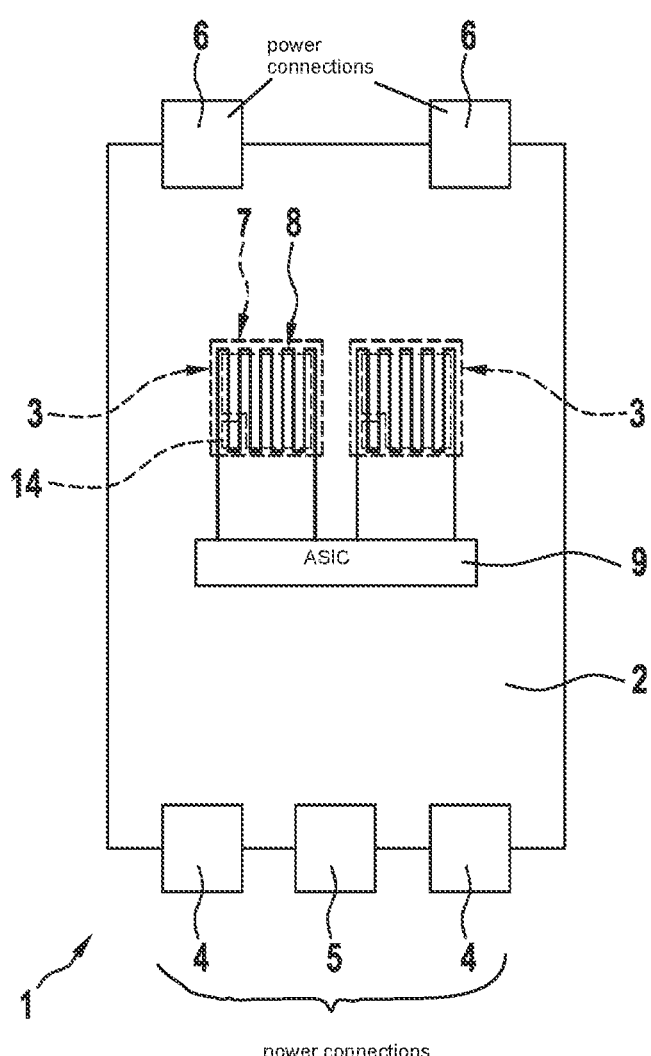
FIG. 1 shows a first specific embodiment of a power module according to the present invention in a view from the top side of the power module

FIG. 1 shows a specific embodiment of a power module 1 according to the present invention, including a substrate 2 and a plurality of (here, merely by way of example, two) power transistors 3 arranged on a bottom side of substrate 2.

FIG. 1 shows a view from the top side of substrate 2, and therefore power transistors 3 on the opposite bottom side or in an inner substrate layer are only indicated by dashed lines.

Power module 1 includes five power connections 4, 5, 6 connected to substrate 2. Power connections 4, 5, 6 may each be connected e.g. to source 7 and gate 14 (indicated with dashed lines in each case, since they are on the bottom side of the substrate or embedded in the substrate) of power transistors 3. Power connections 4 may deliver, e.g., a supply voltage, power connection 5 may provide, e.g., an earth, and power connections 6 may be phase connections. For the sake of simplicity, corresponding control electronics on substrate 2 are not shown here.

According to the present invention, conductor loops 8 for measuring temperature are arranged on a top side of substrate 2 opposite power transistors 3.

Conductor loops 8 have a meandering shape, allowing the size of the conductor path to be increased under the influence of elevated temperature, and thus, for example, allowing the greatest possible absolute effect on the resistance of conductor loops 8 to be achieved.

Conductor loops 8 here are arranged substantially opposite the entire area of the corresponding power transistor 3. However, conductor loops 8 may also cover an area larger than the area of the particular power transistor 3 (e.g. an area 10-100% larger) in order to increase the absolute resistance change measured.

Conductor loop 8 may be connected and guided over a plurality of layers by through-holes (vias) to maximize the length in the hot region over the power transistor (e.g. MOSFET). As a result, the change in resistance of the conductor loop may be increased, thereby improving the sensitivity of the present invention.

Power module 1 includes an application-specific integrated circuit 9 (ASIC), which is connected to both (all) power transistors 3 and to both (all) corresponding conductor loops 8. In this case, ASIC 9 can regulate individual power transistors 3, e.g. by single-gate control, to adjust the thermal load on power transistors 3 (momentarily or over time) and thus to increase the overall life or performance of the power semiconductor device. ASIC 9 may be arranged on the bottom side or top side of the substrate (here, by way of example, on the top side). In the latter case, conductor loops 8 may be connected to ASIC 9 e.g. by way of through-holes (vias).

Conductor loops 8 are connected to ASIC 9 at both ends of conductor loops 8 purely by way of example here, but other types of connection are also possible (e.g. for a four-point measurement) to allow higher accuracy of the resistance measurement.

Figure 2:
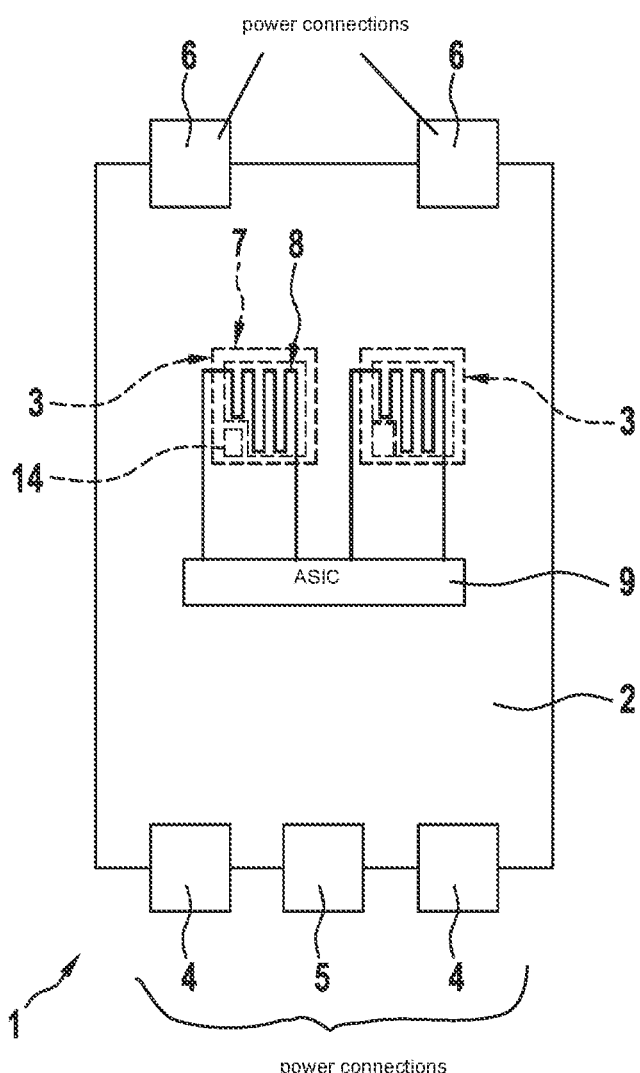
FIG. 2 shows a second specific embodiment of a power module according to the present invention in a view from the top side of the power module

FIG. 2 shows a second specific embodiment of a power module 1 according to the present invention. This specific embodiment substantially corresponds to the first specific embodiment, but with a different area covered by conductor loop 8. Conductor loop 8 here covers substantially only the area of source 7 of power transistor 3, i.e. not gate 14, for example.

In a field-effect transistor, source 7 is generally the greatest source of heat and therefore, for optimum sensitivity, conductor loop 8 may be arranged only opposite source 7. As an alternative, however, the conductor loops may also be arranged opposite another part of power transistor 3 or substantially opposite the entire power transistor (FIG. 1). However, a conductor loop may also cover a plurality of power transistors 3.

Figure 3:
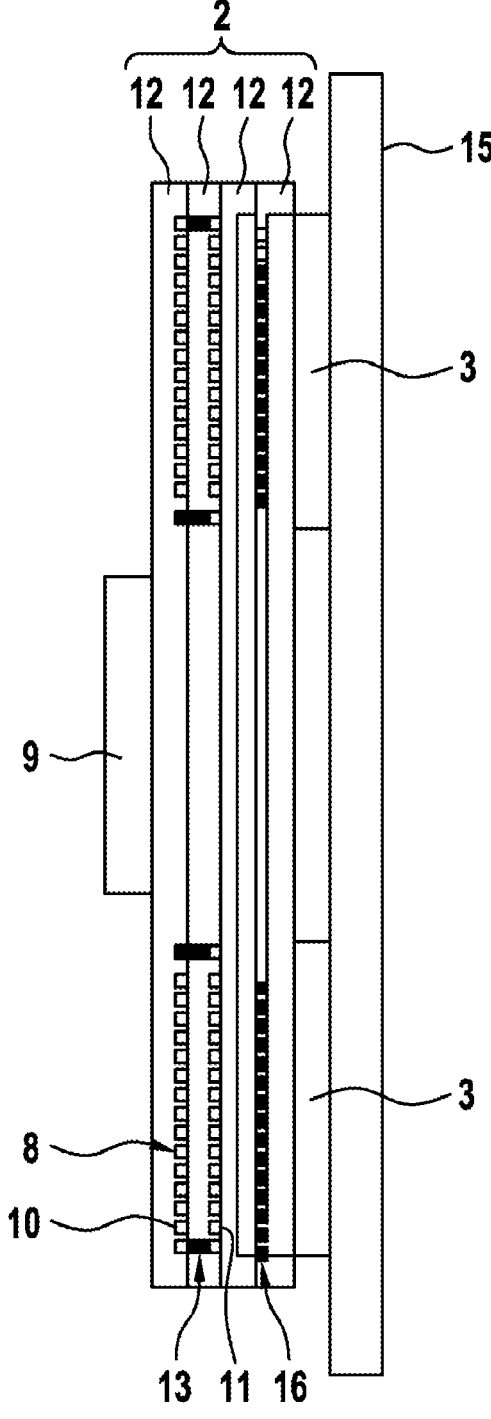
FIG. 3 shows a third specific embodiment of a power module according to the present invention in a cross-sectional view.

FIG. 3 shows a third specific embodiment of a power module 1 according to the present invention, e.g. from FIG. 1 or FIG. 2, in a cross-section through both conductor loops 8 and both power transistors 3. The "top side" of substrate 2 is arranged on the left in each of FIG. 3 and FIG. 4.

Conductor loops 8 here each include two conductor loop portions 10, 11 in two different substrate layers 12 for each power transistor 3. A meandering shape of conductor loop portions 10, 11 can only be surmised in this view since each conductor loop (merely by way of example) is cut thirteen times. Power module 1 here includes a first substrate 2 and a second substrate 15. First substrate 2 here includes four substrate layers 12, but two, three, five or more substrate layers 12 are also possible. Power transistors 3 are embedded between the two substrates 2, 15 (in a sandwich structure, as it were).

Conductor loop portions 10, 11 are connected by way of through-holes 13 (vias) between substrate layers 12. Power transistors 3 are furthermore connected to power wirings 16, which are arranged in particular in the 1-2 substrate layers 12 adjacent to the power transistors. Power wirings 16 in this case are located in different substrate layers 12 than conductor loops 8 for measuring temperature.

Figure 4:
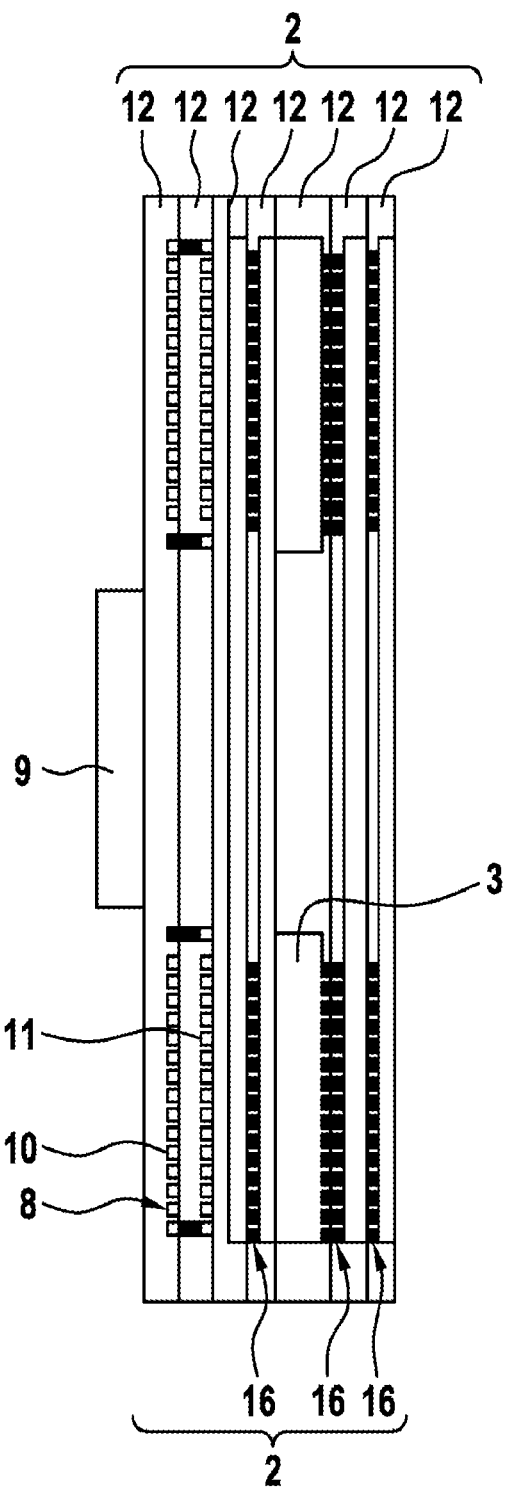
FIG. 4 shows a fourth specific embodiment of a power module according to the present invention in a cross-sectional view.

FIG. 4 shows a fourth specific embodiment of a power module 1 according to the present invention (e.g. also one from FIG. 1 or 2). The fourth specific embodiment differs from the third by the fact that power module 1 has only one substrate 2 with (by way of example here) seven substrate layers 12. Power transistors 3 are embedded between substrate layers 12 of substrate 2. Here, power wirings 16 are arranged on both sides of power transistors 3 in each of the two adjacent substrate layers.

However, in both FIG. 3 and FIG. 4, conductor loops 8 for measuring temperature are arranged in the top substrate layer 12 (far left in each case) and first inner substrate layer 12 therebelow (second from left in each case).

Although the present invention has been described in detail and illustrated more fully through preferred exemplary embodiments, the present invention is not limited by the disclosed examples, and one skilled in the art is able to derive other variations from it without departing from the scope of protection of the present invention.

What is claimed is:

1. A power module, comprising:
a multi-layer substrate including a bottom side of the substrate, wherein the bottom side is a lowest layer of the substrate having conducting elements;
at least one power transistor arranged on the bottom side of the substrate;
at least one power connection connected to the substrate; and
a conductor loop configured to measure temperature is arranged on an inner or outer substrate layer or a top side of the substrate opposite the power transistor.

2. The power module as recited in claim 1, wherein the conductor loop has a meandering shape.

3. The power module as recited in claim 1, wherein the conductor loop is arranged above a source of the power transistor.

4. The power module as recited in claim 1, wherein the conductor loop extends over a plurality of substrate layers.

5. The power module as recited in claim 1, wherein at least two power transistors are arranged on the substrate, wherein a separate conductor loop for measuring temperature is arranged above each of the at least two power transistors in an inner substrate layer or the top side of the substrate.

6. The power module as recited in claim 1, wherein the conductor loop includes a temperature-dependent resistor.

7. The power module as recited in claim 5, further comprising:

at least one application-specific integrated circuit connected to the at least two power transistors and to the separate conductor loops.

8. The power module as recited in claim 7, wherein the application-specific integrated circuit is configured so that it controls the loading of the at least two power transistors in such a way that the temperature measured by the conductor loops is equal.

9. The power module as recited in claim 1, wherein the substrate includes a multi-layer low-temperature co-fired ceramic.

10. The power module as recited in claim 1, wherein the temperature measurement takes place in the conductor loop by way of a four-point measurement or an end-of-line calibration.

11. The power module as recited in claim 1, wherein a plurality of conductor loops are arranged in different substrate layers and connected in series.

12. The power module as recited in claim 1, wherein the power module includes at least two substrates.

13. The power module as recited in claim 1, further comprising a plurality of power semiconductor devices embedded between substrate layers.

14. The power module as recited in claim 12, further comprising a plurality of power semiconductor devices embedded between the two substrates, wherein conductor loops for measuring temperature are arranged in at least one of the substrates.

15. The power module as recited in claim 1, further comprising at least one power semiconductor device, wherein a further conductor loop for measuring temperature is arranged on a top side of the substrate opposite the power semiconductor device.

* * * * *